(12) United States Patent
Varnas

(10) Patent No.: US 7,992,997 B2
(45) Date of Patent: Aug. 9, 2011

(54) OPHTHALMIC LENS ELEMENT

(75) Inventor: Saulius Raymond Varnas, Brighton (AU)

(73) Assignee: Carl Zeiss Vision Australia Holdings Limited, Lonsdale (AU)

( * ) Notice: Subject to any disclaimer, the term of this patent is extended or adjusted under 35 U.S.C. 154(b) by 132 days.

(21) Appl. No.: 12/441,238

(22) PCT Filed: Sep. 14, 2007

(86) PCT No.: PCT/AU2007/001365
§ 371 (c)(1),
(2), (4) Date: May 22, 2009

(87) PCT Pub. No.: WO2008/031166
PCT Pub. Date: Mar. 20, 2008

(65) Prior Publication Data
US 2009/0310082 A1    Dec. 17, 2009

(30) Foreign Application Priority Data

Sep. 15, 2006 (AU) ................................. 2006905101
Mar. 15, 2007 (AU) ................................. 2007901348

(51) Int. Cl.
*G02C 7/06* (2006.01)

(52) U.S. Cl. ......... 351/169; 351/161; 351/164; 351/177

(58) Field of Classification Search ................... 351/169
See application file for complete search history.

(56) References Cited

U.S. PATENT DOCUMENTS

| | | | |
|---|---|---|---|
| 4,912,155 A | 3/1990 | Burton | |
| 4,954,591 A | 9/1990 | Belmares | |
| 5,704,692 A | 1/1998 | Purdy et al. | |
| 5,771,089 A * | 6/1998 | Barth | 351/169 |
| 6,343,861 B1 | 2/2002 | Kris et al. | |
| 6,709,105 B2 * | 3/2004 | Menezes | 351/169 |
| 6,789,896 B2 * | 9/2004 | Morris et al. | 351/159 |
| 6,793,340 B1 * | 9/2004 | Morris et al. | 351/169 |

(Continued)

FOREIGN PATENT DOCUMENTS

WO    WO 97/26843 A1    7/1997

(Continued)

OTHER PUBLICATIONS

Form PCT/ISA/210 (International Search Report) dated Oct. 16, 2007.

(Continued)

*Primary Examiner* — Jessica T Stultz

(74) *Attorney, Agent, or Firm* — Buchanan Ingersoll & Rooney PC

(57) ABSTRACT

An ophthalmic lens element is disclosed. The, ophthalmic lens element includes a central region of low surface astigmatism and a peripheral region. The central region includes an upper viewing zone for providing a first power suitable for a wearer's distance vision tasks. The peripheral region has a positive power relative to the first power, and surrounds the central region. The peripheral region provides an optical correction for retarding or arresting myopia for a wearer and includes one or more regions of relatively higher surface astigmatism, a lower or near viewing zone of low surface astigmatism, and a corridor of low surface astigmatism having a surface power varying from that of the upper viewing zone to that of the lower viewing zone. The lower viewing zone is for a wearer's near vision tasks.

14 Claims, 5 Drawing Sheets

U.S. PATENT DOCUMENTS

2005/0105047 A1    5/2005   Smith, III et al.

FOREIGN PATENT DOCUMENTS

WO    WO 2007/041796 A1    4/2007

OTHER PUBLICATIONS

Form PCT/IPEA/409 (International Preliminary Report on Patentability) dated Aug. 18, 2008.

R.A. Stone et al., Ocular Shape and Myopia, Annals Academy of Medicine, Jan. 2004, vol. 33, No. 1, pp. 7-15.

Donald O. Mutti et al., "Peripheral Refraction and Ocular Shape in Children", Investigative Ophthalmology & Visual Science, Apr. 2000, vol. 41, No. 5, pp. 1022-1030.

Jane Gwiazda et al., "A Randomized Clinical Trial of Progressive Addition Lenses Versus Single Vision Lenses on the Progression of Myopia in Children", Investigative Ophthalmology & Visual Science, Apr. 2003, vol. 44, No. 4, pp. 1492-1500.

Terry W. Walker et al., "The Effect of Accommodation on Ocular Shape", Optometry and Vision Science, Jul. 2002, vol. 79, No. 7, pp. 424-430.

Earl L. Smith III, "Keynote Address: Animal Models and Human Refractive Errors", *Proceedings of the 10th International Myopia Conference*, Jul. 19-24, 2004, p. 15, published by APU, Cambridge, UK.

Josh Wallman, "Keynote Address: Temporal and Spatial Aspects of Visual Guidance of Eye Growth", *Proceedings of the 10th International Myopia Conference*, Jul. 19-24, 2004, p. 18, published by APU, Cambridge, UK.

\* cited by examiner

OPHTHALMIC LENS ELEMENT

This international patent application claims priority from Australian provisional patent application no. 2006905101 filed on 15 Sep. 2006 and Australian provisional patent application no. 2007901348 filed on 15 Mar. 2007, the contents of each of which are to be taken as incorporated herein by this reference.

FIELD OF INVENTION

The present invention relates to ophthalmic lens elements for retarding or arresting myopia, and methods of designing such lens elements.

BACKGROUND OF THE INVENTION

To provide focused vision, an eye must be capable of focusing light on the retina. An eye's ability to focus light on the retina depends, to a large extent, on the shape of the eyeball. If an eyeball is "too long" relative to its "on-axis" focal length (meaning, the focal length along the optical axis of the eye), or if the outside surface (that is, the cornea) of the eye is too curved, the eye will be unable to properly focus distant objects on the retina. Similarly, an eyeball that is "too short" relative to its on-axis focal length, or that has an outside surface which is too flat, will be unable to properly focus near objects on the retina.

An eye that focuses distant objects in front of the retina is referred to as a myopic eye. The resultant condition is referred to as myopia, and is usually correctable with appropriate single-vision lenses. When fitted to a wearer, conventional single-vision lenses correct myopia associated with central vision. Meaning that, conventional single-vision lenses correct myopia associated with vision that uses the fovea and parafovea. Central vision is often referred to as foveal vision.

Although conventional single-vision lenses can correct myopia associated with central vision, recent research has shown (reviewed in R. A. Stone & D. L. Flitcroft (2004) Ocular Shape and Myopia, published in Annals Academy of Medicine, Vol. 33, No. 1, pp.7-15) that off-axis focal length properties of the eye often differ from the axial and paraxial focal lengths. In particular, myopic eyes tend to display less myopia in the retina's peripheral region as compared with its foveal region. This difference may be due to a myopic eye having a prolate vitreous chamber shape.

Indeed, a recent United States study (Mutti, D. O., Sholtz, R. I., Friedman, N. E., Zadnik, K. Peripheral refraction and ocular shape in children, Invest. Opthalmol. Vis. Sci. 2000; Vol. 41, pp. 1022-1030) observed that the mean (±standard deviation) relative peripheral refractions in myopic eyes of children produced +0.80±1.29 D of spherical equivalent.

Interestingly, studies with chicks and monkeys have indicated that a defocus in peripheral retina alone, with the fovea staying clear, can cause an elongation of the foveal region (Josh Wallman and Earl Smith independent reports to 10th International Myopia Conference, Cambridge, UK, 2004) and the consequent myopia.

On the other hand, epidemiological studies have shown the presence of correlation between myopia and near work. It is well known that the prevalence of myopia in the well educated population is considerably higher than that for unskilled labourers. Prolonged reading has been suspected of causing a hyperopic foveal blur due to insufficient accommodation. This has led many eye care professionals to prescribing progressive addition or bi-focal lenses for juveniles manifesting progression of myopia. Special progressive lenses have been designed for use by children (U.S. Pat. No. 6,343,861). The therapeutic benefit of these lenses in clinical trials has been shown to be statistically significant in retarding progression of myopia but clinical significance appears to be limited (e.g., Gwiazda et al., 2003, Invest. Opthalmol. Vis. Sci., Vol. 44, pp. 1492-1500). However, Walker and Mutti (2002), Optom. Vis. Sci., Vol. 79, pp. 424-430, have found that accommodation also increases the relative peripheral refractive error, possibly due to the increased choroidal tension during accommodation pulling the peripheral retina inward.

Unfortunately, conventional myopia correcting lenses haphazardly produce clear or defocused images in the retina's peripheral region. Thus, existing ophthalmic lenses for correcting myopia may fail to remove stimuli for myopia progression.

The discussion of the background to the invention herein is included to explain the context of the invention. This is not to be taken as an admission that any of the material referred to was published, known or part of the common general knowledge as at the priority date of any of the claims.

SUMMARY OF THE INVENTION

In general terms, the present invention provides an ophthalmic lens element that exhibits a relative plus power throughout a peripheral region of the lens as compared to a central region, and a distribution of power and surface astigmatism which provides clear distance vision in the central region and clear near vision in an area of the peripheral region that is likely to be used for a wearer's near vision tasks.

The distribution of relative plus power throughout the peripheral region provides an optical correction for retarding or arresting myopia for a wearer. In use, the provision of the relative plus power throughout the peripheral region provides a "stop signal" around substantially the whole of the periphery of the wearer's retina and is thus likely to be more effective on retarding or arresting progression of myopia compared to ophthalmic lens elements that provide a required stimulus of plus power only in a lower part of the lens element.

The peripheral region includes a region, in the form of a lower or near viewing zone, suitable for the wearer's near vision tasks and which is connected to an upper or distance viewing zone in the central region via a corridor of low astigmatism. The provision of the corridor and the near viewing zone may reduce the need for a lens wearer to tilt their head when reading and thus makes the lens more comfortable to wear.

Thus, the present invention provides an ophthalmic lens element, including:

a central region of low surface astigmatism, the central region including an upper viewing zone providing a first power suitable for a wearer's distance vision tasks; and a peripheral region of positive power relative to the first power, the peripheral region surrounding the central region, the peripheral region for providing an optical correction for retarding or arresting myopia for a wearer, the peripheral region including:
 one or more regions of relatively higher surface astigmatism;
 a lower viewing zone of low surface astigmatism, the lower viewing zone for a wearer's near vision tasks; and
 a corridor of low surface astigmatism having a surface power varying from that of the upper viewing zone to that of the lower viewing zone.

The present invention also provides a progressive ophthalmic lens element including:

an upper viewing zone providing a first refracting power for distance vision; and a peripheral region surrounding the upper viewing zone and providing, throughout the region, positive power relative to the first refracting power, the peripheral region including a lower or near viewing zone providing a refracting power for near vision, and a corridor connecting the upper and lower zones, the corridor having a surface power varying from that of the upper viewing zone to that of the lower viewing zone;

wherein the distribution of mean power throughout the peripheral region is positive relative to that of the upper viewing zone and provides an optical correction for retarding or arresting myopia for a wearer.

The upper viewing zone will be suitable for a wearer's on-axis vision tasks and thus will typically be a viewing zone that is suitable for "straight ahead" viewing, or substantially "straight ahead" viewing. The upper viewing zone will thus typically be positioned in a part of the lens element likely to be used for distance vision.

The first power is typically a prescribed power that corresponds with an optical correction for a wearer's distance vision requirements. Thus, for the remainder of the specification, references to a "distance viewing zone" are to be understood as a reference to the upper viewing zone.

In an embodiment, the peripheral region of positive power is a region that exhibits, throughout the region, positive mean power relative to the first power.

In an embodiment, the lower viewing zone is positioned in a region of the ophthalmic lens that is likely to be used for near vision. The lower viewing zone, which will herein be referred to as a "near viewing zone", may be inset towards a nasal side of the lens relative to the distance viewing zone.

Including the near viewing zone may reduce the need for the wearer to tilt the head during near vision tasks, such as reading, and thus may make the lens more comfortable to wear. Further, including the near viewing zone may reduce accommodative demands imposed on the wearer's eye for near vision tasks, such as reading. Thus, an ophthalmic lens element according to an embodiment of the present invention may be specifically designed for juvenile use since juveniles typically do not have a need for near vision correction due to the availability of the accommodation of the eye to view closer objects. For example, a juvenile may be able to use the distance viewing zone to view the near objects with the help of their accommodation system. However, including the near viewing zone in the peripheral region may assist juvenile wearers in reducing their accommodative demand during near viewing tasks, which has been shown to have a small but not negligible effect on the retardation of the progression of myopia. Therefore, embodiments of the present invention may be more effective in retarding or even arresting progression of myopia, particularly in children, than conventional myopia control lenses.

The distance viewing zone of the ophthalmic lens element may be designed to be used at relatively low plus and minus prescribed powers. For example, a base curve in the range of 0.50 D to 5.00 D may be used. It will be appreciated that the refracting power of the distance viewing zone may vary according to a wearer's requirements, and may be in the range of, for example, plano to −4.00 D.

The power distribution of the peripheral region will contribute to an optical correction for correcting peripheral vision, when the wearer is viewing objects through the distance viewing zone. In use, the power distribution of the peripheral region may provide a stimulus for retarding or arresting myopia in the form of a "stop signal" to the undesirable growth of the eye that retards or arrests myopia progression.

Thus, one embodiment of the present invention provides an ophthalmic lens element that provides suitable optical corrections for a wearer's on-axis distance vision requirements, whilst simultaneously providing a stop signal for retarding or arresting myopia that may otherwise have resulted from an eye's constant exposure to hyperopic blur in the peripheral retina.

In an embodiment, the stop signal may compensate for a varying focal plane of the wearer's eye to remove most of the hyperopic blur from the peripheral region of the retina for a primary distance viewing eye position. Thus, it is expected that the distribution of the positive power throughout the peripheral region of an ophthalmic lens element in accordance with an embodiment of the present invention will provide an optical correction that provides the stop signal for undesirable ocular growth, thus leading to retardation or arresting of myopia around substantially the whole of the periphery of the retina.

An ophthalmic lens element according to an embodiment of the present invention includes a front surface and a back surface (that is, the surface nearest the eye). The front and back surfaces may be shaped to provide suitable contours of refracting power for the central region and the peripheral region. In this specification, the positive mean power of the peripheral region will be referred to as "the peripheral power", and the power of the distance viewing zone will be referred to as "the distance power".

The front surface and the back surface of the lens may have any suitable shape. In an embodiment, the front surface is an aspherical surface and the rear surface is spherical or toric.

In another embodiment, the front surface is a spherical surface and the rear surface is aspherical.

In yet another embodiment, both the front and rear surfaces are aspherical. It will be appreciated that an aspherical surface may include, for example, an atoric surface, a multifocal surface, or combinations thereof.

The first or distance power and the peripheral power will typically correspond with different optical correction requirements of the wearer. In particular, the distance power will correspond with an on-axial, or paraxial, optical correction required to provide clear vision (that is, foveal vision) for a wearer's distance vision tasks, whereas the peripheral power will typically serve dual purposes, namely, providing an off-axis optical correction when viewing distant objects through the upper viewing zone, and an on-axis correction for providing clear vision for a wearer's near vision tasks with reduced accommodative demand, when viewing near objects through the near viewing zone.

The required peripheral power will typically be specified as a single value of surface power, and typically as a positive mean power.

The positive mean power of the peripheral region may be selected based on optical correction requirements expressed in terms of clinical measurements that characterise the wearer's peripheral correction requirements, that is, the optical correction required to correct a wearer's peripheral vision. Any suitable technique may be used to obtain those requirements including, but not limited to, peripheral Rx data or ultrasound A-Scan data. Such data may be obtained through the use of devices that are known in the art, such as an open field auto-refractor (for example, a Shin-Nippon open field auto-refractor).

As explained above, the peripheral region is a region of positive power relative to the distance power and so provides "a plus power correction". The positive power may be in the range of about 0.50 D to 3.00 D relative to the distance power. However, a positive power in range of about 1.00 D to 2.00 D may also be suitable.

In one embodiment, for any radial originating at the geometric centre of the lens element, the positive mean power in the peripheral region at a radial extent of substantially 20 mm is at least 0.50 D relative to the refracting power at the distance reference point of the upper zone.

In another embodiment, at any radial extent of substantially 20 mm, the mean positive power in the peripheral region is at least 1.00 D relative to the refracting power at the distance reference point of the upper zone.

In yet another embodiment, at any radial extent of substantially 20 mm, the positive mean power in the peripheral region is at least 1.50 D relative to the refracting power at the distance reference point of the upper zone.

In an embodiment, the upper or distance viewing zone may be shaped and/or sized to provide a required optical correction over a range of eye-rotations for distance vision tasks. In other words, the distance viewing zone may have a shape and/or size to support a wearer's distance vision requirements throughout an angular range of eye rotations. Similarly, the near viewing zone may also have a shape and/or size providing a region of low surface astigmatism over a range of eye-rotations for a wearer's near vision tasks. In other words, the near or lower viewing zone may be shaped and/or sized to support a wearer's near vision requirements throughout an angular range of eye rotations.

The area of the distance viewing zone will typically be greater than the area of the near viewing zone.

The present invention also provides a progressive ophthalmic lens element including:
an upper viewing zone providing a first refracting power for distance vision, the first refracting power in the range of substantially plano to −4.00 D; and
a peripheral region surrounding the upper viewing zone and providing, throughout the region, positive power relative to the first refracting power, the peripheral region including a lower or near viewing zone providing a refracting power for near vision, and a corridor connecting the upper and lower zones, the corridor having a surface power varying from that of the upper viewing zone to that of the lower viewing zone;
wherein for any radial originating at the geometric centre of the lens element, the positive mean power in the peripheral region at all radial extents of greater than substantially 20 mm is at least 0.50 D relative to the refracting power at the distance reference point of the upper zone, and wherein the distribution of positive mean power throughout the peripheral region provides an optical correction for retarding or arresting myopia for a wearer.

An ophthalmic lens element according to an embodiment of the present invention may be formulated from any suitable material. In one embodiment a polymeric material may be used. The polymeric material may be of any suitable type, for example, it may include a thermoplastic or thermoset material. A material of the diallyl glycol carbonate type, for example CR-39 (PPG Industries) may be used.

The polymeric article may be formed from cross-linkable polymeric casting compositions, for example as described in U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material.

An ophthalmic lens element according to an embodiment of the present invention may further include standard additional coatings to the front or back surface, including electrochromic coatings.

The front lens surface may include an anti-reflective (AR) coating, for example of the type described in U.S. Pat. No. 5,704,692, the entire disclosure of which is incorporated herein by reference.

The front lens surface may include an abrasion resistant coating, for example, of the type described in U.S. Pat. No. 4,954,591, the entire disclosure of which is incorporated herein by reference.

The front and back surfaces may further include one or more additions conventionally used in casting compositions such as inhibitors, dyes including thermochromic and photochromic dyes, for example, as described above, polarising agents, UV stabilisers and materials capable of modifying refractive index.

The present invention also provides a method of dispensing or designing an ophthalmic lens element for retarding or arresting myopia, the method including:
obtaining, for the wearer:
a first required value of optical correction for an upper viewing zone to provide foveal vision for on-axis viewing tasks; and
a second required value of optical correction for providing a stimulus for retarding or arresting myopia in a peripheral region of a wearer's eye;
selecting or designing an ophthalmic lens element according to the values of optical correction, the ophthalmic lens element including:
a central region of low surface astigmatism, the central region including an upper viewing zone providing a first power corresponding to the first required value of optical correction; and
a peripheral region of positive power relative to the first power, the peripheral region surrounding the central region and providing a distribution of positive power that includes the second required value of optical correction, the peripheral region including:
one or more regions of relatively higher surface astigmatism;
a second viewing zone of low surface astigmatism, the second viewing zone for a wearer's near vision tasks; and
a corridor of low surface astigmatism having a surface power varying from that of the upper viewing zone to that of the second viewing zone.

In one embodiment, a method according to the present invention may further include:
determining the head movement and/or eye movement characteristics of the wearer; and
sizing the upper viewing zone, the lower viewing zone and the corridor according to the head movement and eye movement characteristics of the wearer.

Ideally, the upper viewing zone, the second viewing zone and the corridor will be sized to support clear vision throughout an angular range of eye rotations encompassing a wearer's distance vision and near vision requirements.

A method according to an embodiment of the present invention may be performed by a processing system including suitable computer hardware and software. Thus, the present invention also provides a processing system for dispensing or designing an ophthalmic lens element for retarding or arresting myopia in a wearer's eye, the system including:

an input means for obtaining, for the wearer:
a first required value of optical correction for an upper viewing zone to provide foveal vision for on-axis viewing tasks; and
a second required value of optical correction for providing a stimulus for retarding or arresting myopia in a peripheral region of a wearer's eye;
a processing means for processing the values of optical correction to select or design an ophthalmic lens element according to the values of optical correction, the ophthalmic lens element including:
a central region of low surface astigmatism, the central region including an upper viewing zone providing a first power corresponding to the first required value of optical correction; and
a peripheral region of positive power relative to the first power, the peripheral region surrounding the central region and providing a distribution of positive power that includes the second required value of optical correction, the peripheral region including:
one or more regions of relatively higher surface astigmatism;
a second viewing zone of low surface astigmatism, the second viewing zone for a wearer's near vision tasks; and
a corridor of low surface astigmatism having a surface power varying from that of the upper viewing zone to that of the second viewing zone.

In an embodiment, a system according to the present invention further includes:
input means for accepting or obtaining head movement and eye movement characteristics for the wearer; and
processing means for modifying the size and/or shape of the upper viewing zone and/or the second viewing zone according to the head movement and eye movement characteristics of the wearer.

The present invention also provides a method of retarding or arresting myopia, the method including providing, to a myope, spectacles bearing a pair of ophthalmic lens elements, each lens element for a respective eye and including:
a central region of low surface astigmatism, the central region including an upper viewing zone proving a first power suitable for a wearer's distance vision tasks;
a peripheral region of positive power relative to the first power, the peripheral region surrounding the central region, the peripheral region for providing an optical correction for retarding or arresting myopia for a wearer, the peripheral region including:
one or more regions of relatively higher surface astigmatism;
a second viewing zone of low surface astigmatism, the second viewing zone for a wearer's near vision tasks; and
a corridor of low surface astigmatism having a surface power varying from that of the upper viewing zone to that of the second viewing zone.

A preferred embodiment of a lens element according to the invention provides an ophthalmic lens element having a peripheral region that provides a positive mean power (that is, "a plus power correction") relative to the first or upper viewing zone of the central region. However, since positive refracting power is not accommodatable, it will induce blur on the fovea of the retina when the eye rotates to view objects in the periphery of the original field of view. To remedy this, an embodiment of the ophthalmic lens element provides a central region that includes a distance viewing zone that is sized to provide a prescribed power over an area that corresponds with a wearer's typical eye rotations for distance vision tasks and, separately, a near viewing zone having a positive mean power relative to the distance zone over an area that corresponds with a wearer's typical eye rotations for near vision tasks.

Thus, an embodiment may provide a correct foveal correction, not just for a wearer's distance and near vision requirements, but also in the area representing the extent of typical eye rotations before the head rotation gets engaged.

The level of the plus power correction required by wearer will vary, given the large scatter in the myopic peripheral refractions found by Mutti et al. (2000). Thus, in a series embodiment of the present invention, a number of peripheral aspherisations may be provided with the range of plus power corrections.

Before turning to a description of an embodiment of the present invention, there should be some explanation of some of the language used above and throughout the specification.

For example, the reference in this specification to the term "lens element" is a reference to all forms of individual refractive optical bodies employed in the ophthalmic arts, including, but not limited to lenses, lens wafers and semi-finished lens blanks requiring further finishing to a particular patient's prescription.

Further, with respect to references to the term "surface astigmatism", such references are to be understood as a reference to a measure of the degree to which the curvature of the lens varies among intersecting planes which are normal to the surface of the lens at a point on the surface.

Throughout this specification, references to the term "foveal region" are to be understood as a reference to a region of the retina that includes the fovea and that is bounded by the parafovea.

Further, throughout this specification, references to the term "peripheral region", when used in relation to the retina, denotes a reference to a region of the retina that is outside, and surrounds, the foveal region.

An ophthalmic lens element according of the present invention simultaneously and substantially corrects both central and peripheral vision during distance vision tasks. Correction of this type is expected to remove, or at least delay, a presumed trigger of myopia progression in myopes, particularly in myopic juveniles.

BRIEF DESCRIPTION OF THE DRAWINGS

The present invention will now be described in relation to various examples illustrated in the accompanying drawings. However, it must be appreciated that the following description is not to limit the generality of the above description.

In the drawings.

DETAILED DESCRIPTION OF THE DRAWINGS

Figure 1:
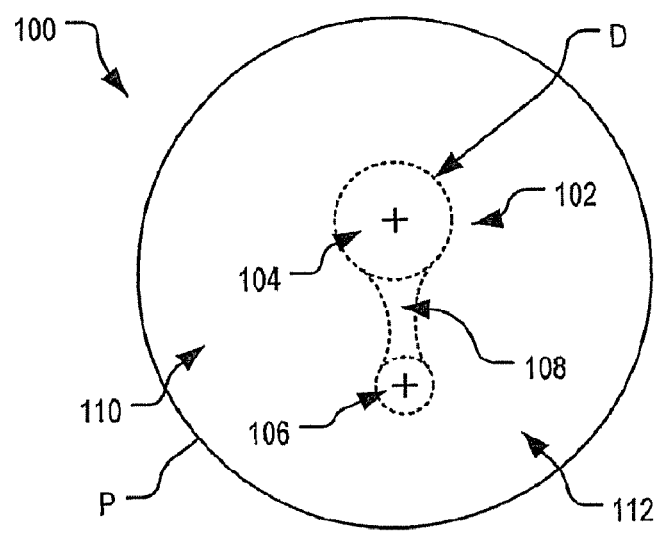
FIG. 1 is a simplified diagram showing the different zones of an ophthalmic lens element according to an embodiment of the present invention.

FIG. 1 depicts a simplified representation of an ophthalmic lens element 100 in accordance with an embodiment of the present invention with the different zones identified for reference. FIG. 1 is simplified in as much as it is only intended to generally identify and represent the relative locations of the different zones of the ophthalmic lens element 100. As a result, it is not intended that the shape of the different zones, nor their size or precise location, be restricted to that illustrated in FIG. 1.

As depicted in FIG. 1, the ophthalmic lens element 100 includes a region, shown here as central region 102, of relatively low surface astigmatism. The region 102 includes a first or upper viewing zone 104 having a first power suitable for a wearer's distance vision tasks, a second or near viewing zone 106, and a corridor 108. The second or near viewing zone 106 is positioned so as be suitable for a wearer's near vision tasks, and thus is a lower viewing zone. For the remainder of this description the first or upper viewing zone 104 will be referred to as a "distance viewing zone" whereas the second viewing zone or lower viewing zone will be referred to as a "near viewing zone".

In the illustrated embodiment, the lens element 100 also includes and a region 110 of relatively high astigmatism (which is shown here as the region bounded by the perimeter "P" of the lens element and the outer dashed line "D") which surrounds the region 102 of relatively low surface astigmatism. It will be appreciated that it is not essential that the region 110 of relatively high surround the region 102 of relatively low surface astigmatism.

The positive power of the near viewing zone 106 will be suitable for a wearer's near vision tasks and provide a reduced accommodative demand when viewing near objects through the zone 106.

The corridor 108 provides a zone of low surface astigmatism having a surface power varying from that of the distance viewing zone 104 to that of the near viewing zone 106.

In the present case, the near viewing zone 106, the corridor 108, and the region 110 form a peripheral region 112 of positive mean power relative to the first power. For ease of explanation, a simplified illustration of the arrangement of the peripheral region 112 is depicted in FIG. 7 in which the peripheral region 112 is shown as a shaded region.

Returning again to FIG. 1, the distance viewing zone 104 provides a prescribed power suitable for a wearer's on-axis distance vision. On the other hand, the peripheral region 112 is a zone of positive mean power (relative to the distance viewing zone 104) having a distribution that provides an optical correction for arresting or retarding myopia for a wearer and which is suitable for a wearer's near vision requirements. The peripheral region 112 will typically exhibit a low to medium range of positive power relative to the power of the distance viewing zone 104.

Figure 7:
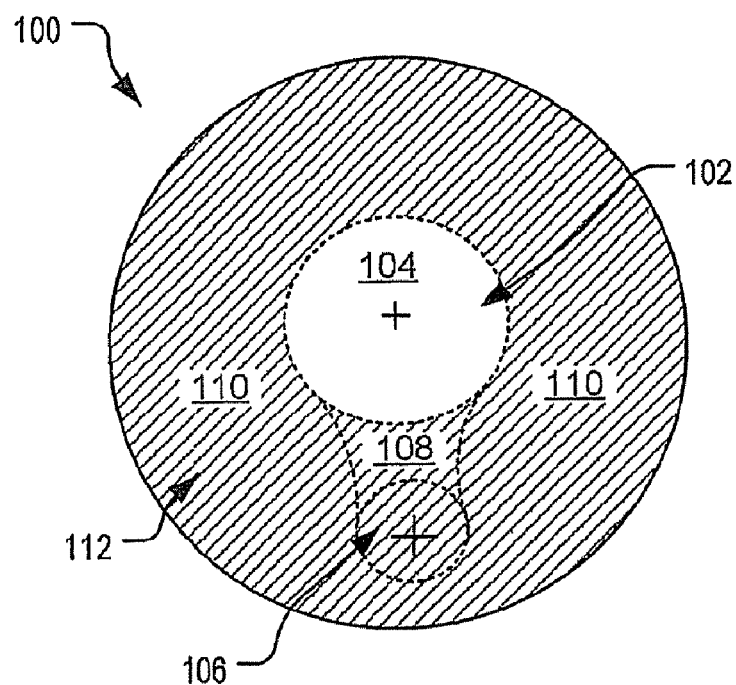
FIG. 7 shows another simplified representation of the ophthalmic lens element shown in FIG. 1 but with the peripheral region shown as a shaded region.

As shown in FIG. 7, the peripheral region 112 surrounds the central region 102 in that it extends around the central region 102 to provide a continuous zone of positive power relative to the first power.

Figure 8:
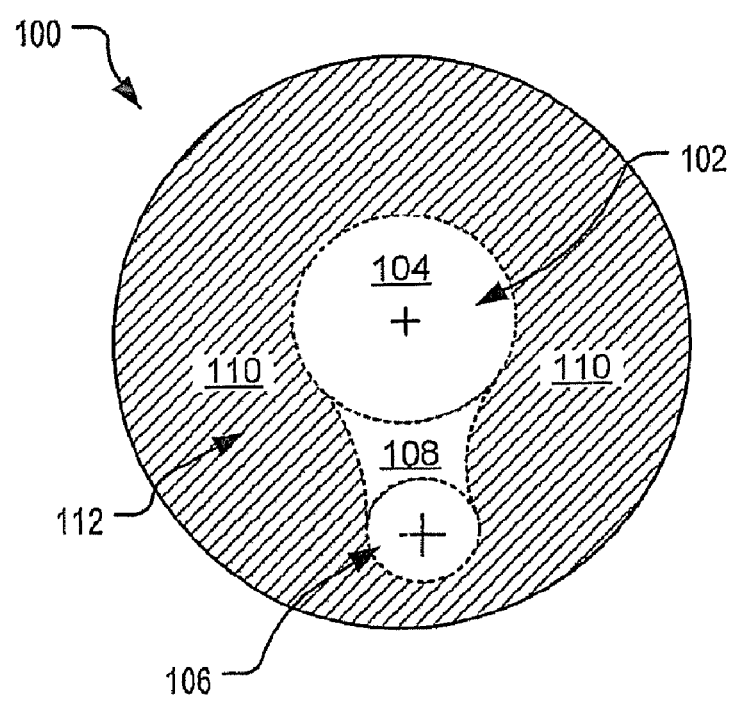
FIG. 8 shows another simplified representation of the ophthalmic lens element shown in FIG. 1 but with the region of relatively higher surface astigmatism shown as a shaded region.

The near viewing zone 106 and the corridor 108 of the peripheral region 112 will have a relatively low surface astigmatism as compared to the region 110 (in other words, the region bounded by the "D" and "P") which will provide a relatively higher surface astigmatism. For ease of explanation, FIG. 8 depicts the region 110 of relatively higher surface astigmatism as a shaded region and the regions of lower surface astigmatism (that is, the distance viewing zone 104, the near viewing zone 106, and the corridor 108) as an unshaded region. Although in the example the region of relatively higher astigmatism is depicted as a single region that entirely surrounds the regions of low astigmatism (in other words, the distance zone 104, the corridor 108, and the near zone 106), it will of course be understood that this need not always be the case. For example, in some embodiments, the corridor 108 and the near zone 106 intersect the region of relatively higher astigmatism 110 so that that region forms an arc extending between opposite sides of the corridor 108 and near zone 108 and above the distance zone 104.

Returning again to FIG. 1, and as explained previously, the peripheral region 112 provides a stimulus for retarding or arresting myopia associated with a peripheral region of the retina by providing an optical correction for the wearer's peripheral vision. Such an arrangement is likely to be much more effective in retarding or even arresting progression of myopia, particularly in children, than conventional myopia control lenses.

The positive mean power of the peripheral region may be selected based on optical correction requirements expressed in terms of clinical measurements that characterise the wearer's peripheral correction requirements, that is, the optical correction required to correct a wearer's peripheral vision. Any suitable technique may be used to obtain those requirements including, but not limited to, peripheral Rx data or ultrasound A-Scan data. Such data may be obtained through the use of devices that are known in the art, such as an open field auto-refractor (for example, a Shin-Nippon open field auto-refractor).

Figure 9:
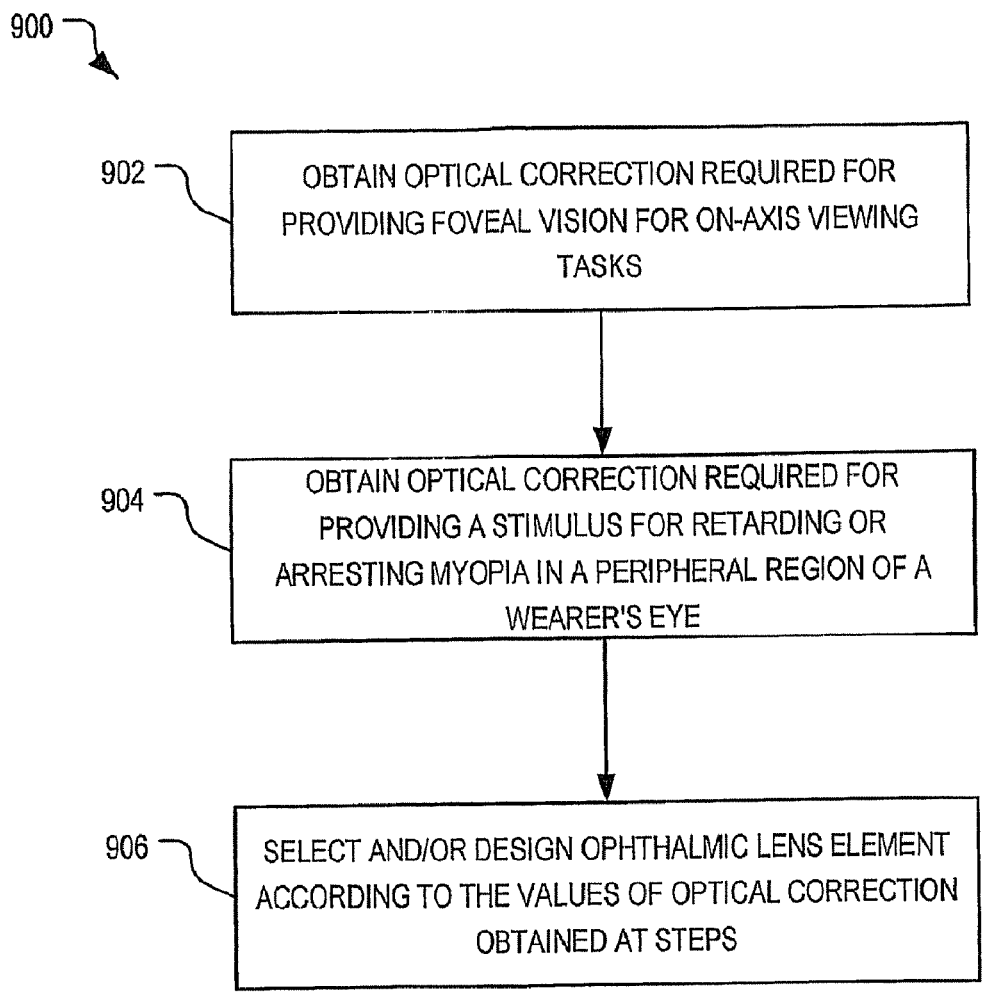
FIG. 9 is a flow diagram of a method of selecting and/or designing an ophthalmic lens according to an embodiment.

An ophthalmic lens according to an embodiment of the present invention may be designed, dispensed and/or selected according to peripheral correction measurements for a wearer. FIG. 9 shows a flow diagram 900 for a method of dispensing or designing an ophthalmic lens element for retarding or arresting myopia. As shown, at step 902 an optical correction required for providing foveal vision for on-axis viewing tasks is obtained.

At step 904, a second value of optical correction required for providing a stimulus for retarding or arresting myopia in a peripheral region of a wearer's eye is obtained. In other words, the optical correction required to correct a wearer's peripheral vision.

At step 906, an ophthalmic lens element is selected and/or designed according to the values of optical correction obtained at steps 902, 904. The selected and/or designed ophthalmic lens includes a central region of low surface astigmatism including a distance zone 104 (ref. FIG. 1) providing a first power corresponding to the first required value of optical correction, and a peripheral region of positive power relative to the first power, which surrounds and includes one or more regions of relatively higher surface astigmatism 110

(ref. FIG. 1). The peripheral region will also includes a lower or near zone 108 for a wearer's near vision task and a corridor 108 (ref. FIG. 1) having a surface power varying from that of the upper viewing 104 (ref. FIG. 1) zone to that of the lower viewing zone 106 (ref. FIG. 1). The peripheral region provides a distribution of positive mean power that corresponds with, or is selected based on, the second required value of optical correction.

The selection and/or design of the lens element may also involve selecting and/or designing the size and/or shape of the distance viewing zone 104 so as to correspond with the extent of a wearer's typical eye rotations before they engage head rotation. For example, the distance viewing zone 104 may provide an aperture which is shaped and/or sized to provide clear foveal vision over a range of eye rotations. Similarly, the shape and/or size of the near viewing zone 108 may be selected and/or designed based on measurements of a wearer's typical eye rotations before they engage head rotation.

EXAMPLE 1

Figure 2:
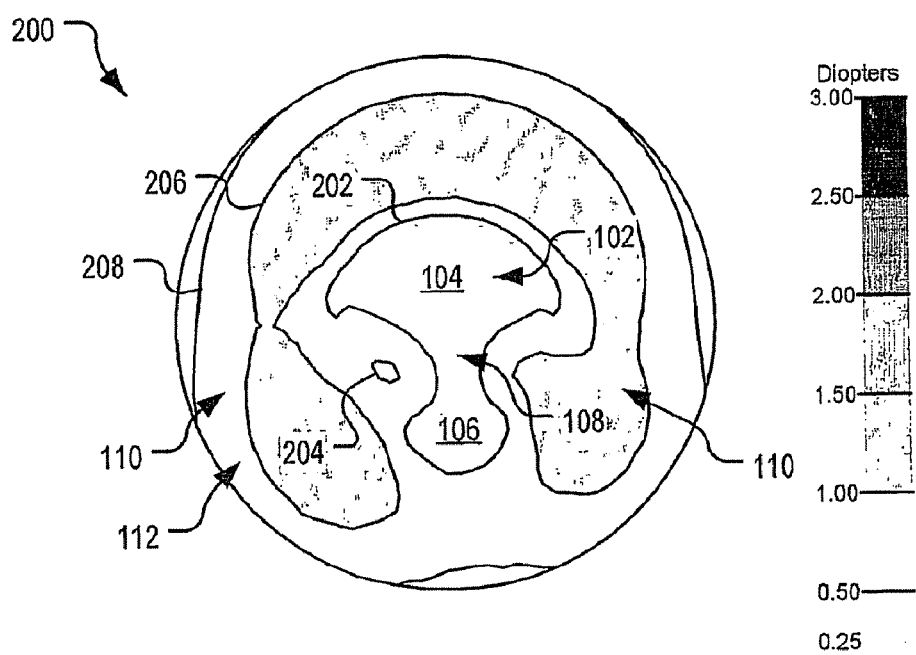
FIG. 2 is a contour plot of surface astigmatism for an ophthalmic lens element according to an embodiment of the present invention.
Figure 3:
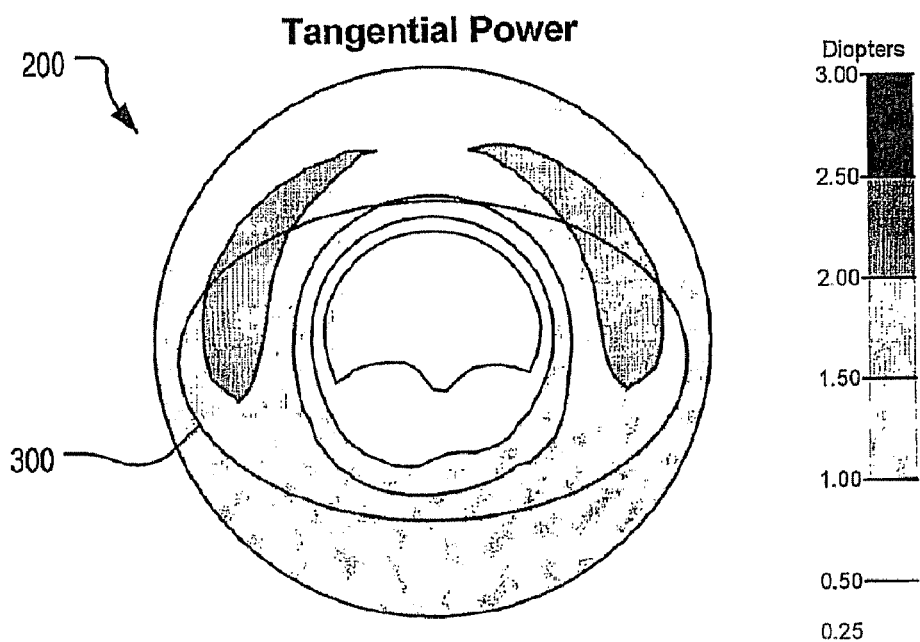
FIG. 3 is a contour plot of tangential power for the ophthalmic lens element having the contour plot of surface astigmatism depicted in FIG. 2.
Figure 4:
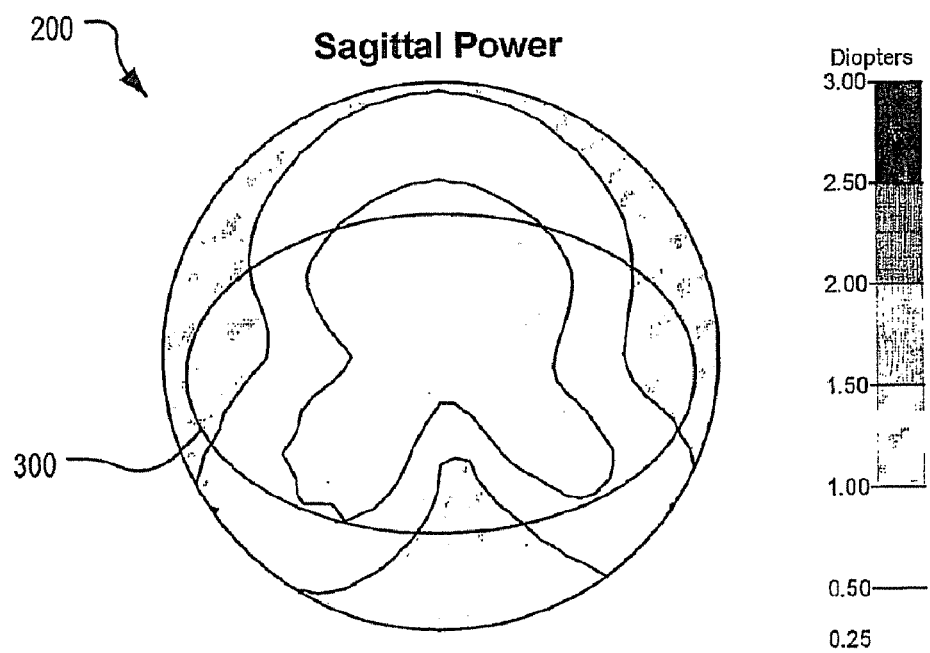
FIG. 4 is a contour plot of sagittal power for the ophthalmic lens element having the contour plot of surface astigmatism depicted in FIG. 2.
Figure 5:
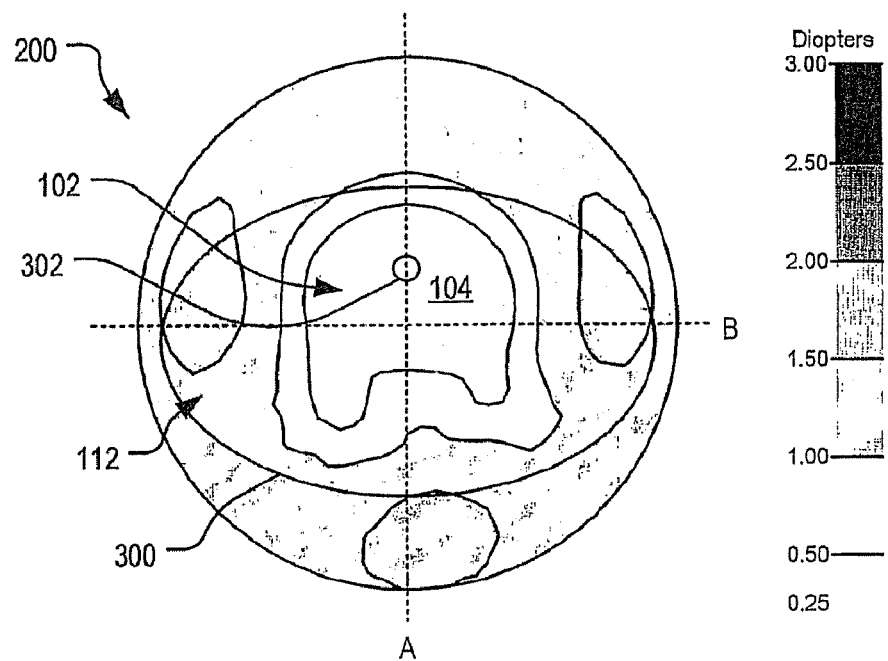
FIG. 5 is a contour plot of mean power for the ophthalmic lens element having the contour plot of surface astigmatism depicted in FIG. 2.

With reference to FIG. 2 to FIG. 5, an optical lens element 200 according to an embodiment of the present invention was designed having a 3.25 D base curve. In the depicted example, the lens element 200 has a diameter of 60 mm. The contour plots of surface astigmatism, tangential power, sagittal power and mean surface power respectively for the optical lens element 200 are given in FIG. 2 to FIG. 5 respectively. FIG. 3 to FIG. 5 also depict, for reference, a lens overlay 300 representing an example of a lens shape which may be cut from the lens element 200. In the present case, lens overlay 300 represents the outline of a frame measuring 55×35 mm centered 2 mm above the geometric centre of the ophthalmic lens element 200.

As shown in FIG. 2, the 0.5 D astigmatic contour 202 defines a region of low surface astigmatism including the distance viewing zone 104, the near viewing zone 106, and the corridor 108. The depicted embodiment provides a relatively wide distance viewing zone 104, which is an upper zone, and a near viewing zone 106 positioned below the distance viewing zone 104 and connected thereto via the corridor 108.

In the depicted example, a region 112 of relatively higher surface astigmatism encircles the region 102 and includes the astigmatic contours 204, 206, 208. In the present case contours 204 and 206 have the same value. As is shown in FIG. 5, the region 112 provides a positive mean power of up to around 1.50 D relative to the mean power of the distance viewing zone 104 at the distance reference point (DRP). In the present example, the distance reference point 302 (ref. FIG. 5) is located about 8 mm above the geometric centre of the ophthalmic lens element 200.

Figure 6:
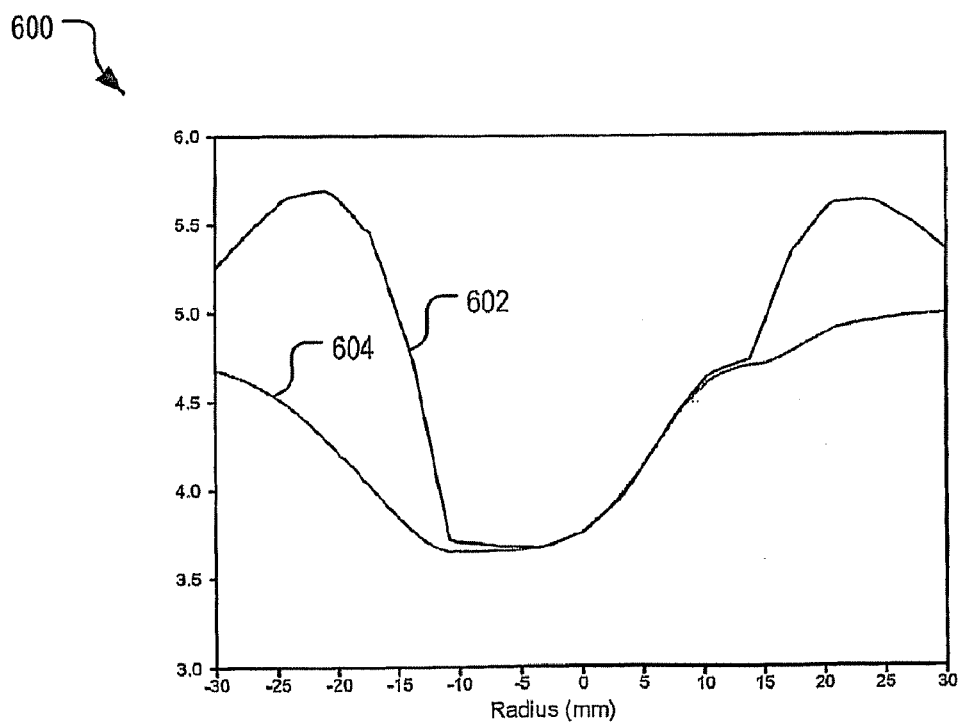
FIG. 6 is a graph showing eyepath tangential and sagittal curvature profiles for the ophthalmic lens element having the contour plot of surface astigmatism depicted in FIG. 2.

FIG. 6 depicts the tangential 602 and sagittal powers 604 of the ophthalmic lens element 200 along a 280 degree meridian that typically corresponds to a wearer's eyepath for near viewing in the lower part of the ophthalmic lens element 200. As depicted, in FIG. 6 the ophthalmic lens element 200 provides a curvature of about 3.75 D that extends out to a distance of about 10 mm above the geometric centre of the lens.

The depicted lens provides positive tangential and sagittal powers of at least 0.50 at a radial extent of 20 mm from the geometric centre (in other words, the intersection of lines "A" and "B" in FIG. 5) of the lens element. Indeed, in the present example, for any radial originating at the geometric centre of the lens element 200, and having radial extent of substantially 20 mm, the positive mean power in the peripheral region is at least 0.50 D relative to the refracting power at the distance reference point of the distance zone 104. It will of course be appreciated that other embodiments of the present invention may provide a similar, or greater, positive mean power at a lower radial extent.

Finally, it will be understood that there may be other variations and modifications to the configurations described herein that are also within the scope of the present invention.

The invention claimed is:

1. An ophthalmic lens element, including:
   a central region of low surface astigmatism, the central region including an upper viewing zone providing a first power suitable for a wearer's distance vision tasks; and
   a peripheral region of positive power relative to the first power, the peripheral region surrounding the central region, and including:
      one or more regions of relatively higher surface astigmatism;
      a lower or near viewing zone of low surface astigmatism, the lower viewing zone for a wearer's near vision tasks; and
      a corridor of low surface astigmatism having a surface power varying from that of the upper viewing zone to that of the lower viewing zone;
   wherein the peripheral region provides an optical correction for retarding or arresting myopia for a wearer.

2. An ophthalmic lens element according to claim 1 wherein the first power is a prescribed power for providing an optical correction corresponding to a wearer's on-axis distance vision viewing requirements.

3. An ophthalmic lens element according to claim 1 wherein the peripheral region's optical correction provides a stimulus for retarding or arresting myopia associated with a peripheral region of the retina.

4. An ophthalmic lens element according to claim 3 wherein the positive mean power throughout the peripheral region, at all radial extents greater than 20 mm from the geometric centre of the lens element is in the range of 0.50 D to 3.00 D relative to the refracting power at the distance reference point of the upper zone.

5. An ophthalmic lens element according to claim 3, wherein for any radial originating at the geometric centre of the lens element, the positive mean power in the peripheral region at a radial extent of substantially 20 mm is at least 0.50 D relative to the refracting power at the distance reference point of the upper zone.

6. An ophthalmic lens element according to claim 3, wherein for any radial originating at the geometric centre of the lens element, the positive mean power in the peripheral region at a radial extent of substantially 20 mm is at least 1.00 D relative to the refracting power at the distance reference point of the upper zone.

7. An ophthalmic lens element according to claim 3, wherein for any radial originating at the geometric centre of the lens element, the positive mean power in the peripheral region at a radial extent of substantially 20 mm is at least 1.50 D relative to the refracting power at the distance reference point of the upper zone.

8. An ophthalmic lens element according to claim 1 wherein the refracting power in the upper viewing zone is in the range from plano to −4.00 D.

9. A lens element according to claim 8, wherein the upper viewing zone is an aperture having a shape and/or size that corresponds with the extent of a wearer's typical eye rotations before they engage head rotation.

10. A series of ophthalmic lens elements according to claim 1 wherein each lens in the series provides a peripheral region having a range of positive mean power corresponding with different peripheral correction requirements.

11. A series of ophthalmic lens elements according to claim 10 wherein for each lens in the series, and for a radial originating at the geometric centre of the lens element, the positive mean power in the peripheral zone at any radial extent greater than substantially 20 mm is at least 0.50 D relative to the refracting power at the distance reference point of the upper zone, and wherein the positive mean power at that radial extent varies by up to 2.50 D depending on the peripheral correction requirement of the wearer.

12. A series of ophthalmic lens elements according to claim 10 Of wherein for each lens in the series the size and/or shape of the upper zone is associated with a predetermined range of eye rotations for the wearer.

13. A method of dispensing or designing an ophthalmic lens element for retarding or arresting myopia for a wearer, the method including:
  obtaining, for the wearer:
    a first required value of optical correction for an upper viewing zone to provide foveal vision for on-axis viewing tasks; and
    a second required value of optical correction for providing a stimulus for retarding or arresting myopia in a peripheral region of a wearer's eye;
  selecting or designing an ophthalmic lens element according to the first and second required values of optical correction, the ophthalmic lens element including:
    a central region of low surface astigmatism, the central region including a first or upper viewing zone providing a first power corresponding to the first required value of optical correction; and
    a peripheral region of positive mean power relative to the first power, the peripheral region surrounding the central region, the peripheral region including:
      one or more regions of relatively higher surface astigmatism;
      a lower or near zone of low surface astigmatism, the lower viewing zone for a wearer's near vision tasks; and
    a corridor of low surface astigmatism having a surface power varying from that of the upper viewing zone to that of the lower viewing zone;
  wherein peripheral region provides a distribution of positive mean power that corresponds with the second required value of optical correction.

14. A series of ophthalmic lens elements according to claim 11 wherein for each lens in the series the size and/or shape of the upper zone is associated with a predetermined range of eye rotations for the wearer.

* * * * *